United States Patent
Sun et al.

(10) Patent No.: US 9,320,101 B2
(45) Date of Patent: Apr. 19, 2016

(54) LED LIGHTING DEVICE AND LED CONTROL SYSTEM

(71) Applicant: ZHEJIANG SHENGHUI LIGHTING CO., LTD, Jiaxing (CN)

(72) Inventors: Chaoqun Sun, Jiaxing (CN); Jiayang Ruan, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 66 days.

(21) Appl. No.: 14/461,683

(22) Filed: Aug. 18, 2014

(65) Prior Publication Data

US 2014/0354162 A1    Dec. 4, 2014

Related U.S. Application Data

(63) Continuation-in-part of application No. PCT/CN2013/076563, filed on May 31, 2013.

(30) Foreign Application Priority Data

Apr. 11, 2013    (CN) .......................... 2013 1 0126154

(51) Int. Cl.
*H05B 37/02*    (2006.01)
*H05B 33/08*    (2006.01)

(52) U.S. Cl.
CPC ........ *H05B 33/0845* (2013.01); *H05B 37/0236* (2013.01); *H05B 37/0272* (2013.01); *Y02B 20/48* (2013.01)

(58) Field of Classification Search
CPC .... H05B 37/00; H05B 37/02; H05B 37/0236; H05B 37/0272; H05B 33/08; H05B 33/0842; H05B 33/0845; Y02B 20/48
USPC ......... 315/112, 161, 291, 292, 294, 297, 307, 315/308, 362
See application file for complete search history.

(56) References Cited

U.S. PATENT DOCUMENTS

2006/0154642 A1*  7/2006  Scannell, Jr. ............. A01G 9/02
                                                              455/404.1

FOREIGN PATENT DOCUMENTS

CN          202735830 U    2/2013

* cited by examiner

*Primary Examiner* — Jimmy Vu
(74) *Attorney, Agent, or Firm* — Anova Law Group, PLLC

(57) ABSTRACT

LED lighting device and LED control system are provided. An LED lighting device includes an LED power supply unit, a controller unit, a microphone module, a wireless communication module, and an LED light source assembly. An LED control system includes at least one LED lighting device, at least one of a smart terminal and a cloud server, and at least one smart home appliance. When a user sends a voice command to the LED lighting device, the LED lighting device captures and processes signal data from the voice command to provide control data to the smart terminal or cloud server, which then recognizes and processes the control data to provide processed control data. The processed control data are then sent to a corresponding smart home appliance communicated with the smart terminal or the cloud server to control an operation of the smart home appliance.

20 Claims, 1 Drawing Sheet

LED LIGHTING DEVICE AND LED CONTROL SYSTEM

CROSS-REFERENCES TO RELATED APPLICATIONS

This application is a continuation-in-part of PCT Application No. PCT/CN2013/076563, filed on May 31, 2013, which claims the priority to Chinese Patent Application No. 201310126154.0, filed on Apr. 11, 2013, the entire contents of which are incorporated herein by reference.

FIELD OF THE DISCLOSURE

The present disclosure relates to the field of LED (light emitting diode) lighting technology and, more particularly, relates to an LED lighting device and an LED control system.

BACKGROUND

Wireless technology has been applied to various electronic products and has freed people from cumbersome cablings and assemblies. Products with wireless technologies are now commonly used. LED devices have also been widely used in various areas for public or commercial indoor lighting. LED lighting may provide advantages such as energy conservation, environmental protection, controllable lighting, solid state lighting, and long operational lifetime.

Smart home control systems may include a smart home control device managing a network of devices and appliances. Such smart home control device often includes a home gateway connected to an external network. The home gateway is connected to one or more of a home central controller, an audio-video capturing controller, an access controller, a lighting controller, a home appliance controller, a home environment sensor, a home alarm, an actuator, and a network connector, via a wired and/or wireless network. By configuring a variety of sensors, controllers, actuators, and identification devices related to home appliances and home furnishings and by the connections of wired/wireless networks, automated control and real-time manual control of household goods can be realized.

BRIEF SUMMARY OF THE DISCLOSURE

One aspect or embodiment of the present disclosure includes an LED lighting device. The LED lighting device includes at least one LED light source assembly configured to provide lighting, at least one LED power supply unit configured to drive the at least one LED light source assembly and to provide power to the LED lighting device, at least one controller unit, at least one microphone module connected to the at least one controller unit, and at least one wireless communication module connected to the at least one controller unit. The at least one microphone module is configured to capture an audio signal and to send to the at least one controller unit for processing, such that the at least one controller unit provides control data. The at least one wireless communication module is configured to receive the control data from the at least one controller unit and to send the control data to at least one of a smart terminal and a cloud server to control an operation of a smart home appliance. The at least one LED light source assembly is further configured to receive the control data from the at least one controller unit and to adjust the lighting according to the control data.

Optionally, the at least one controller unit is configured to process the audio signal to provide the control data. The at least one wireless communication module supports a frequency band including 2.4 GHz, 5.2 GHz, 5.8 GHz, and a combination thereof.

Optionally, the at least one LED power supply unit, the at least one controller unit, the at least one microphone module, at least one wireless communication module, and the at least one LED light source assembly are integrated into a lamp body of the LED lighting device to form a single device. Optionally, the at least one microphone module is integrated with a driver circuit of the LED power supply unit. An embedded antenna is integrated in the lamp body of the LED lighting device.

The at least one of the smart terminal and the cloud server includes a voice recognition module to further recognize and process the control data. The smart terminal further includes a wireless transceiver module to send the processed control data from the voice recognition module to the smart home appliance. The wireless transceiver module supports a bi-directional transmission. Optionally, the smart terminal is remotely controlled. Optionally, the smart terminal is integrated into a lamp body of the LED lighting device.

Another aspect or embodiment of the present disclosure includes an LED control system. The LED control system includes at least one LED lighting device, each including at least one controller unit, at least one microphone module, at least one wireless communication module, and at least one LED light source assembly. The LED control system also includes a smart terminal capable of communicating with the at least one LED lighting device. The smart terminal includes a voice recognition module and a wireless transceiver module. The LED control system also includes at least one smart home appliance, each including a wireless receiver module capable of communicating with the wireless transceiver module of the smart terminal.

The at least one microphone module is connected to the at least one controller unit to capture an audio signal from a voice command and to send the audio signal to the at least one controller unit for processing, such that the at least one controller unit provides control data. The at least one wireless communication module is connected to the at least one controller unit to receive the control data therefrom and to send the control data to the smart terminal. The at least one LED light source assembly is configured to provide lighting and to receive the control data from the at least one controller unit to adjust the lighting according to the control data. The voice recognition module of the smart terminal is configured to recognize and process the control data from the at least one LED lighting device, and to send the processed control data, via the wireless transceiver module, to one or more smart home appliances selected from the at least one smart home appliance according to the processed control data such that an operation of the one or more smart home appliances is controlled according to the processed control data.

The at least one controller unit is configured to process the audio signal to provide the control data. The at least one wireless communication module supports a frequency band including 2.4 GHz, 5.2 GHz, 5.8 GHz, and a combination thereof.

Optionally, the at least one LED power supply unit, the at least one controller unit, the at least one microphone module, at least one wireless communication module, and the at least one LED light source assembly are integrated into a lamp body of the LED lighting device to form a single device. The at least one microphone module is integrated with a driver circuit of the LED power supply unit. Optionally, an embedded antenna is integrated in the lamp body of the LED lighting device.

Optionally, the smart terminal is a gateway controller. Alternatively, the smart terminal is a mobile phone or a computer.

Another aspect or embodiment of the present disclosure includes an LED control system. The LED control system includes at least one LED lighting device, each including at least one controller unit, at least one microphone module, at least one wireless communication module, and at least one LED light source assembly. The LED control system also includes a cloud server capable of communicating with the at least one LED lighting device. The cloud server includes a voice recognition module and a processor. The LED control system also includes at least one smart home appliance, each including a wireless receiver module capable of communicating with the cloud server.

The at least one microphone module is connected to the at least one controller unit to capture an audio signal from a voice command and to send the audio signal to the at least one controller unit for processing, such that the at least one controller unit provides control data. The at least one wireless communication module is connected to the at least one controller unit to receive the control data therefrom and to send the control data to the cloud server. The at least one LED light source assembly is configured to provide lighting and to receive the control data from the at least one controller unit to adjust the lighting according to the control data. The voice recognition module and the processor of the cloud server are configured to recognize and process the control data from the at least one LED lighting device, and to send the processed control data, via the wireless transceiver module, to one or more smart home appliances selected from the at least one smart home appliance according to the processed control data such that an operation of the one or more smart home appliances is controlled according to the processed control data.

Optionally, the at least one LED power supply unit, the at least one controller unit, the at least one microphone module, at least one wireless communication module, and the at least one LED light source assembly are integrated into a lamp body of the LED lighting device to form a single device. The at least one microphone module is integrated with a driver circuit of the LED power supply unit. Optionally, an embedded antenna is integrated in the lamp body of the LED lighting device.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
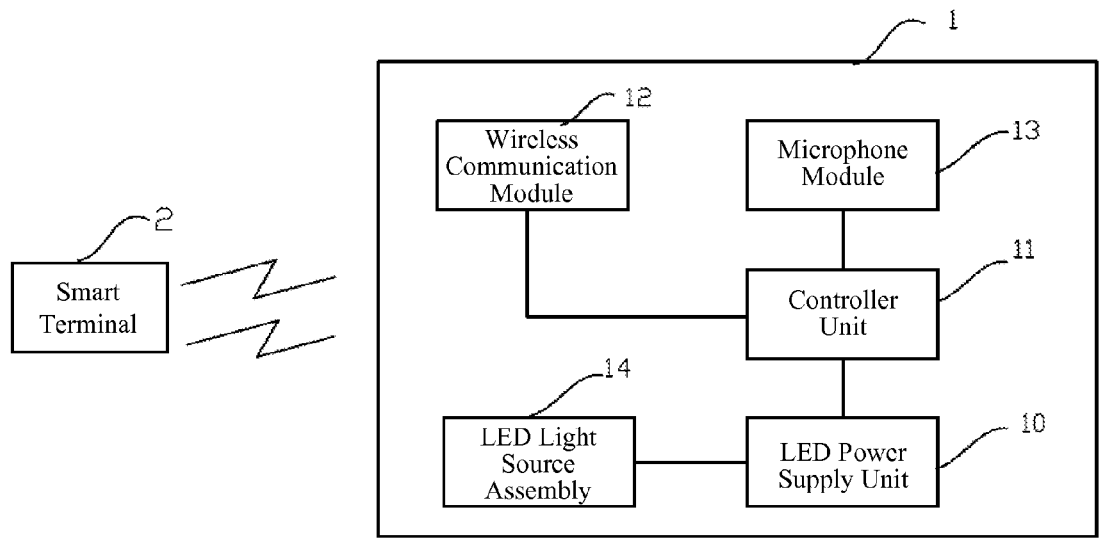
FIG. 1 is a schematic illustrating an exemplary LED lighting device consistent with various disclosed embodiments.

Reference will now be made in detail to exemplary embodiments of the disclosure, which are illustrated in the accompanying drawings. Wherever possible, the same reference numbers will be used throughout the drawings to refer to the same or like parts.

An LED lighting device and LED control system are provided. The disclosed LED lighting device and LED control system are easy to assemble, easy to use, and have low cost. In addition, existing cabling/wiring methods can still be used without any changes. In one embodiment, an LED lighting device can be configured to communicate with a smart terminal and/or a cloud server.

For example, an LED lighting device can include an LED power supply unit configured to drive an LED light source assembly and to provide power to the entire LED lighting device. A controller unit can be configured to process signal data of an audio signal (and/or a control signal) and to provide control data after the processing. A microphone module can be connected to the controller unit to capture the signal data from ambient sounds/voices to send to the controller unit for processing. A wireless communication module can be connected to the controller unit to receive the control data and to send the control data to the smart terminal. The LED light source assembly can be configured to provide lighting and to receive the control data sent from the controller unit for adjusting the lighting according to the control data.

An LED control system can be provided to include at least one LED lighting device, a smart terminal, and/or at least one smart home appliance. The smart terminal can include a voice recognition module and a wireless transceiver module. The smart home appliance can include a wireless receiver module to communicate with the smart terminal, e.g., by a network such as internet. For example, a user may give a voice command to the LED lighting device. The LED lighting device can capture and process audio from the voice command to provide control data and then send the control data to the smart terminal. The smart terminal can recognize and process the control data and then send the processed control data to a corresponding smart home appliance networked with the smart terminal to control the operation of the smart home appliance.

The control data may provide data for controlling lighting (e.g., dimming) of the LED light source assembly and for controlling operations of one or more smart home appliances selected according to the control data.

In various embodiments, controlling operation of a smart home appliance may include, e.g., switching on/off the smart home appliance, changing parameters of the smart home appliance (e.g., setting/altering a temperature for refrigerator or air conditioning, setting/altering a time for starting a dishwasher, etc.), etc.

The smart home appliance can be placed anywhere as desired, e.g., at a residential house, an office, or any suitable indoor/outdoor places. For example, a smart home appliance can be placed in a hallway, a room, or any suitable places in a building. The smart home appliance(s) can be controlled individually or as a group, in response to the control data sent via the smart terminal. The smart terminal can be a gateway controller. Optionally, the smart terminal can be a mobile phone or a computer.

As such, in addition to providing regular lighting and wireless dimming control, the disclosed LED lighting device can be built-in with a microphone module. Wherever the disclosed LED lighting device is installed, audio signals captured by the microphone module, e.g., from a voice command, can be sent to a controller unit for processing to provide control data. The control data can be sent to a smart terminal for further processing. The processed control data can be sent to substantially all of smart home appliance(s) (or selected smart home appliances) that are connected with the smart terminal. In this manner, the disclosed LED lighting device can also provide control of smart home appliances.

FIG. 1 is a schematic illustrating an exemplary LED lighting device consistent with various disclosed embodiments.

As shown in FIG. 1, the exemplary LED lighting device 1 includes at least one LED power supply unit 10, at least one controller unit 11, at least one wireless communication module 12, at least one microphone module 13, and/or at least one LED light source assembly 14.

The LED power supply unit 10 can be used to drive the LED light source assembly 14, and to supply power to the entire LED lighting device 1.

The controller unit 11 can include a digital signal processor, a microcontroller, or a digital IC (i.e., integrated circuit) controller, and/or a combination thereof. The controller unit 11 can be configured to process signal data including: an audio signal, a control signal, a video signal, and/or other suitable signals, to provide control data for controlling lighting of the LED lighting device and for controlling operation of desired smart home appliance(s). For example, the controller unit 11 can process these signal data.

The microphone module 13 can be connected to the controller unit 11. The microphone module 13 can be configured to capture the signal data from ambient voices/sounds from, e.g., a user, a device, a machine, etc. The captured signal data can then be processed by the controller unit 11 to provide the control data, which are then sent out to a smart terminal 2 by the wireless communication module 12 of the LED lighting device 1.

In one embodiment, the wireless communication module 12 can support one or more frequency bands including 4 GHz, 5.2 GHz, and 5.8 GHz. The wireless communication module 12 can have access to the Internet or any suitable network to allow the LED light device 1 to communicate with the smart terminal 2. The wireless communication module 12 can be remotely controlled.

In one embodiment, the controller unit 11 can generate a PWM (pulse-width module) signal for controlling lighting (e.g., dimming) of the LED light source assembly 14. The controller unit 11 can be directly connected to the LED power supply unit 10 (which drives the LED light source assembly 14). The controller unit 11 can set and output PWM signal. The PWM signal can be set with a fixed constant frequency, an adjustable or a constant duty cycle, and an adjustable frequency with a fixed duty cycle.

In various embodiments, the disclosed LED lighting device can be configured as one single device. For example, as shown in FIG. 1, the at least one LED power supply unit 10, at least one controller unit 11, at least one wireless communication module 12, at least one microphone module 13, and/or at least one LED light source assembly 14, can be integrated into a lamp body of the LED lighting device to form a single device.

In one embodiment, the microphone module can be integrated with driver circuit of the LED power supply unit to save space and to reduce wire loss on of a distributed design. Optionally, an embedded antenna can be included in the integrated LED lighting device. The embedded antenna can be configured to accommodate shape of the lamp body of the LED lighting device without increasing size of the resultant device and to maintain original design of the LED lighting device. Further, the wireless communication module can be configured with automatic frequency hopping functions to avoid interference with other radio devices. Furthermore, noise reduction and/or echo cancellation technologies can be applied using software and hardware products to provide the LED lighting device with desired audio effects.

Figure 2:
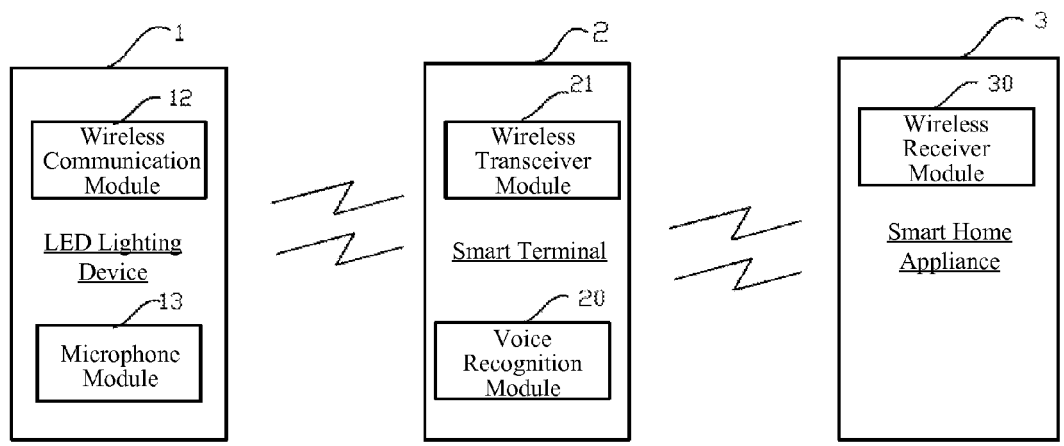
FIG. 2 is a schematic illustrating an exemplary LED control system consistent with various disclosed embodiments.

FIG. 2 is a schematic illustrating an exemplary LED control system. As shown in FIG. 2, the exemplary LED control system can be a smart home control system, including at least one LED lighting device 1, a smart terminal 2, and/or at least one smart home appliance 3.

The smart terminal 2 can include a voice recognition module 20 and a wireless transceiver module 21. The wireless transceiver module 21 can support a bi-directional transmission. The smart home appliance 3 can include a wireless receiver module 30 networked with the smart terminal 2. In one embodiment, the smart home appliance 3 can be wirelessly connected with the smart terminal 2.

In an exemplary embodiment, voice commands can be directly sent to the LED lighting device 1, for example, by a user. The microphone module 13 in the LED lighting device 1 can capture signal data (e.g., audio signal) from the voice commands, which can then be processed by the controller unit 11 to provide control data.

The control data can be sent to the smart terminal 2 via the wireless communication module 12 in the LED lighting device 1. Because the smart terminal 2 has been built-in with the voice recognition module 20, the user's voice commands (signal data) can be recognized and further processed by the voice recognition module 20. The processed control signal can then be sent, via the wireless transceiver module 21 of the smart terminal 2, to one or more smart home appliances 3 (e.g., white and black appliances) that are networked with the smart terminal 2.

The operation of the one or more smart home appliances 3 can thus be controlled according to the processed control data. Such one or more smart home appliances 3 can include substantially all smart home appliances that are related or connected to the smart terminal 12, or include those selected from all of the smart home appliances according to the processed control data. In this manner, the disclosed LED lighting device can be used in a control system to control operations of smart home appliances.

The smart terminal in the LED control system can be a fixed gateway controller. Alternatively, a mobile phone, a computer and/or other suitable devices can be used to replace the gateway controller to check status and to remotely control the smart home appliance(s).

The at least one LED lighting device, the smart terminal, and the at least one smart home appliance can communicate with one another, e.g., via internet or any suitable network. The smart terminal can be configured to read status of the smart home appliance(s) and to locally and/or remotely control operational status of the smart home appliance(s). The smart terminal can also establish communication with the LED lighting device to receive control data. The smart terminal can recognize and process the control data and send the control data to smart home appliance(s) for controlling operations of the smart home appliance(s).

In an exemplary LED control system, the at least one LED lighting device, the smart terminal, and/or the at least one smart home appliance can be configured in a fixed location, e.g., within a same room or different rooms of a building or a house. In one embodiment, the LED lighting device (and/or the smart terminal) can be configured remotely from the at least one smart home appliance to check and/or control their operations. In some embodiments, the smart terminal can be configured within or attached onto the LED lighting device. In other embodiments, the smart terminal can be configured within or attached onto the smart home appliance(s).

Lighting of the LED lighting device can be controlled by the controller unit of the LED lighting device (and/or the smart terminal), for example, when a voice command is received. Meanwhile, operations of related smart home appliance(s) can be controlled by the controller unit of the LED lighting device and the smart terminal.

In some embodiments, multiple LED lighting devices may be included in the LED control lighting system and used to accommodate various user needs. For example, different users may individually send a voice command to different LED lighting devices to control lighting of each LED light device and to control operations of the same or different smart home appliance(s), simultaneously or sequentially. In some cases, a same LED lighting device may be used to control the same or different smart home appliance(s) at different times. In other cases, different LED lighting devices may be used to control the same smart home appliance(s) at different times.

In this manner, the disclosed LED lighting device and LED control system can wirelessly control lighting (e.g., dimming) of the LED lighting device(s) and can also control operations of smart home appliance(s). The disclosed device and system can also be easily installed and assembled without changing existing wirings/cablings. The disclosed LED lighting device can be used to replace traditional lamps and traditional LED lights.

In various embodiments, a server such as a cloud server can be used to replace the terminal device. For example, while the terminal device can provide local voice recognition, the cloud server can provide cloud voice recognition. An exemplary LED control system may thus include at least one LED lighting device, a cloud server, and/or at least one smart home appliance. In one embodiment, the cloud server can at least include a voice recognition module and/or one or more processors.

In an exemplary embodiment, voice commands can be directly sent to the LED lighting device by a user. The microphone module in the LED lighting device can capture signal data (e.g., audio signal) from the voice commands, which can then be processed by the controller unit to provide control data. The control data can be sent to the cloud server via the wireless communication module in the LED lighting device. User's voice commands (signal data) can be recognized and further processed by the voice recognition module and the processor in the cloud server. The processed control signal can then be sent from the cloud server to one or more smart home appliances that can communicate with the cloud server. In this manner, the disclosed LED lighting device can be used in a control system to control operations of smart home appliances via the cloud server.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

LED lighting device and LED control system are provided. An LED lighting device includes an LED power supply unit, a controller unit, a microphone module, a wireless communication module, and an LED light source assembly. An LED control system includes at least one LED lighting device, at least one of a smart terminal and a cloud server, and/or at least one smart home appliance.

In one example, when a user sends a voice command to the LED lighting device, the LED lighting device captures and processes signal data from the voice command to provide control data, which are then sent to the at least one of smart terminal and cloud server. The smart terminal or cloud server can recognize and process the control data to provide processed control data. The processed control data can be sent to a corresponding smart home appliance connected to the smart terminal or cloud server to control an operation of the smart home appliance.

The disclosed LED lighting device and LED control system can wirelessly control lighting (e.g., dimming) of the LED lighting device(s) and can also locally or remotely control operations of smart home appliance(s). The disclosed device and system are easy to assemble, easy to use, and of low cost.

REFERENCE SIGN LIST

LED lighting device 1
Smart terminal 2
Smart home appliance 3
LED power supply unit 10
Controller unit 11
Wireless communication module 12
Microphone module 13
LED light source assembly 14
Voice recognition module 20
Wireless transceiver module 21
Wireless receiver module 30

What is claimed is:

1. An LED lighting device, comprising:
   at least one LED light source assembly configured to provide lighting;
   at least one LED power supply unit configured to drive the at least one LED light source assembly and to provide power to the LED lighting device;
   at least one controller unit;
   at least one microphone module connected to the at least one controller unit; and
   at least one wireless communication module connected to the at least one controller unit, wherein:
   the at least one microphone module is configured to capture an audio signal and to send to the at least one controller unit for processing, such that the at least one controller unit provides control data,
   the at least one wireless communication module is configured to receive the control data from the at least one controller unit and to send the control data to at least one of a smart terminal and a cloud server to control an operation of a smart home appliance, and
   the at least one LED light source assembly is further configured to receive the control data from the at least one controller unit and to adjust the lighting according to the control data.

2. The device according to claim 1, wherein the at least one controller unit is configured to process the audio signal to provide the control data.

3. The device according to claim 1, wherein the at least one wireless communication module supports a frequency band including 2.4 GHz, 5.2 GHz, 5.8 GHz, and a combination thereof.

4. The device according to claim 1, wherein the at least one LED power supply unit, the at least one controller unit, the at least one microphone module, at least one wireless communication module, and the at least one LED light source assembly are integrated into a lamp body of the LED lighting device to form a single device.

5. The device according to claim 4, wherein the at least one microphone module is integrated with a driver circuit of the LED power supply unit.

6. The device according to claim 4, further including an embedded antenna integrated in the lamp body of the LED lighting device.

7. The device according to claim 1, wherein the at least one of the smart terminal and the cloud server comprises a voice recognition module to further recognize and process the control data.

8. The device according to claim 7, wherein the smart terminal further comprises a wireless transceiver module to send the processed control data from the voice recognition module to the smart home appliance, wherein the wireless transceiver module supports a bi-directional transmission.

9. An LED control system, comprising:
at least one LED lighting device, each comprising at least one controller unit, at least one microphone module, at least one wireless communication module, and at least one LED light source assembly;
a smart terminal capable of communicating with the at least one LED lighting device, the smart terminal comprising a voice recognition module and a wireless transceiver module; and
at least one smart home appliance, each comprising a wireless receiver module capable of communicating with the wireless transceiver module of the smart terminal, wherein:
the at least one microphone module is connected to the at least one controller unit to capture an audio signal from a voice command and to send the audio signal to the at least one controller unit for processing, such that the at least one controller unit provides control data,
the at least one wireless communication module is connected to the at least one controller unit to receive the control data therefrom and to send the control data to the smart terminal,
the at least one LED light source assembly is configured to provide lighting and to receive the control data from the at least one controller unit to adjust the lighting according to the control data, and
the voice recognition module of the smart terminal is configured to recognize and process the control data from the at least one LED lighting device, and to send the processed control data, via the wireless transceiver module, to one or more smart home appliances selected from the at least one smart home appliance according to the processed control data such that an operation of the one or more smart home appliances is controlled according to the processed control data.

10. The system according to claim 9, wherein the at least one controller unit is configured to process the audio signal to provide the control data.

11. The system according to claim 9, wherein the at least one wireless communication module supports a frequency band including 2.4 GHz, 5.2 GHz, 5.8 GHz, and a combination thereof.

12. The system according to claim 9, wherein the at least one LED power supply unit, the at least one controller unit, the at least one microphone module, at least one wireless communication module, and the at least one LED light source assembly are integrated into a lamp body of the LED lighting device to form a single device.

13. The system according to claim 12, wherein the at least one microphone module is integrated with a driver circuit of the LED power supply unit.

14. The system according to claim 12, further including an embedded antenna integrated in the lamp body of the LED lighting device.

15. The system according to claim 9, wherein the smart terminal is a gateway controller.

16. The system according to claim 9, wherein the smart terminal is a mobile phone or a computer.

17. An LED control system, comprising:
at least one LED lighting device, each comprising at least one controller unit, at least one microphone module, at least one wireless communication module, and at least one LED light source assembly;
a cloud server capable of communicating with the at least one LED lighting device, the cloud server comprising a voice recognition module and a processor; and
at least one smart home appliance, each comprising a wireless receiver module capable of communicating with the cloud server, wherein:
the at least one microphone module is connected to the at least one controller unit to capture an audio signal from a voice command and to send the audio signal to the at least one controller unit for processing, such that the at least one controller unit provides control data,
the at least one wireless communication module is connected to the at least one controller unit to receive the control data therefrom and to send the control data to the cloud server,
the at least one LED light source assembly is configured to provide lighting and to receive the control data from the at least one controller unit to adjust the lighting according to the control data, and
the voice recognition module and the processor of the cloud server are configured to recognize and process the control data from the at least one LED lighting device, and to send the processed control data to one or more smart home appliances selected from the at least one smart home appliance according to the processed control data such that an operation of the one or more smart home appliances is controlled according to the processed control data.

18. The system according to claim 17, wherein the at least one LED power supply unit, the at least one controller unit, the at least one microphone module, at least one wireless communication module, and the at least one LED light source assembly are integrated into a lamp body of the LED lighting device to form a single device.

19. The system according to claim 18, wherein the at least one microphone module is integrated with a driver circuit of the LED power supply unit.

20. The system according to claim 17, further including an embedded antenna integrated in the lamp body of the LED lighting device.

* * * * *